United States Patent
Kwon et al.

(10) Patent No.: US 8,412,206 B2
(45) Date of Patent: Apr. 2, 2013

(54) COMMUNICATION SYSTEM HAVING NETWORK ACCESS STRUCTURE

(75) Inventors: Tae Soo Kwon, Hwaseong Si (KR); Kyung Hun Jang, Suwon-si (KR); Dong Ho Cho, Seoul (KR); Chang Yong Shin, Seoul (KR); O Hyun Jo, Cheongju-si (KR); Jung Min Moon, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 337 days.

(21) Appl. No.: 12/785,039

(22) Filed: May 21, 2010

(65) Prior Publication Data

US 2011/0096736 A1 Apr. 28, 2011

(30) Foreign Application Priority Data

Oct. 28, 2009 (KR) ........................ 10-2009-0102694

(51) Int. Cl.
*H04W 36/00* (2009.01)
(52) U.S. Cl. ........ 455/444; 455/443; 455/447; 455/449; 455/453; 370/329
(58) Field of Classification Search .................. 455/444, 455/443, 453, 449; 370/329
See application file for complete search history.

(56) References Cited

U.S. PATENT DOCUMENTS

| | | | | |
|---|---|---|---|---|
| 5,548,806 A | * | 8/1996 | Yamaguchi et al. | 455/441 |
| 5,666,361 A | * | 9/1997 | Aznar et al. | 370/392 |
| 5,946,618 A | * | 8/1999 | Agre et al. | 455/428 |
| 6,014,564 A | * | 1/2000 | Donis et al. | 455/436 |
| 6,940,810 B1 | * | 9/2005 | Roa-Diaz | 370/217 |
| 7,065,576 B2 | * | 6/2006 | Kamel et al. | 709/227 |
| 7,664,504 B2 | * | 2/2010 | Bishop | 455/446 |
| 2003/0129984 A1 | * | 7/2003 | Dent | 455/446 |
| 2004/0008654 A1 | | 1/2004 | Klein et al. | |
| 2004/0266444 A1 | * | 12/2004 | Yano | 455/446 |
| 2005/0088992 A1 | * | 4/2005 | Bolin et al. | 370/329 |
| 2005/0113112 A1 | * | 5/2005 | Bolin et al. | 455/456.1 |
| 2005/0174954 A1 | | 8/2005 | Yun et al. | |
| 2006/0098670 A1 | * | 5/2006 | Voit et al. | 370/401 |
| 2006/0176900 A1 | * | 8/2006 | Liu et al. | 370/465 |

(Continued)

FOREIGN PATENT DOCUMENTS

| | | |
|---|---|---|
| KR | 10-2005-0047553 | 5/2005 |
| KR | 10-2005-0115077 A | 12/2005 |

(Continued)

OTHER PUBLICATIONS

International Search Report mailed Jan. 24, 2011, issued in counterpart Korean Patent Application No. PCT/KR2010/003758; 4 pages in English language.

*Primary Examiner* — Kamran Afshar
*Assistant Examiner* — Mong-Thuy Tran
(74) *Attorney, Agent, or Firm* — NSIP Law

(57) ABSTRACT

A communication system with an improved network access structure for inter-cell cooperation is provided. The communication system includes a central unit and at least one radio access unit. The at least one radio access unit may form at least one virtual cell by merging or separating cells of radio access units according to a distribution of terminals, statuses of channels, an amount of traffic, and the like.

23 Claims, 15 Drawing Sheets

U.S. PATENT DOCUMENTS

| | | | |
|---|---|---|---|
| 2007/0156804 A1* | 7/2007 | Mo | 709/200 |
| 2007/0280175 A1* | 12/2007 | Cheng et al. | 370/338 |
| 2008/0102836 A1* | 5/2008 | Wang et al. | 455/436 |
| 2008/0113670 A1 | 5/2008 | Dufour et al. | |
| 2008/0159242 A1* | 7/2008 | Rayzman et al. | 370/338 |
| 2008/0188231 A1* | 8/2008 | Zhu et al. | 455/450 |
| 2009/0017828 A1* | 1/2009 | Lee et al. | 455/446 |
| 2009/0029645 A1* | 1/2009 | Leroudier | 455/7 |
| 2010/0062783 A1* | 3/2010 | Luo et al. | 455/450 |
| 2010/0142471 A1* | 6/2010 | Cheng et al. | 370/329 |
| 2010/0197311 A1* | 8/2010 | Walldeen et al. | 455/444 |

FOREIGN PATENT DOCUMENTS

| | | |
|---|---|---|
| KR | 10-2009-0009339 | 1/2009 |
| KR | 10-2009-0030907 | 3/2009 |
| KR | 10-2009-0043573 A | 5/2009 |

* cited by examiner

FIG. 3 (RELATED ART)
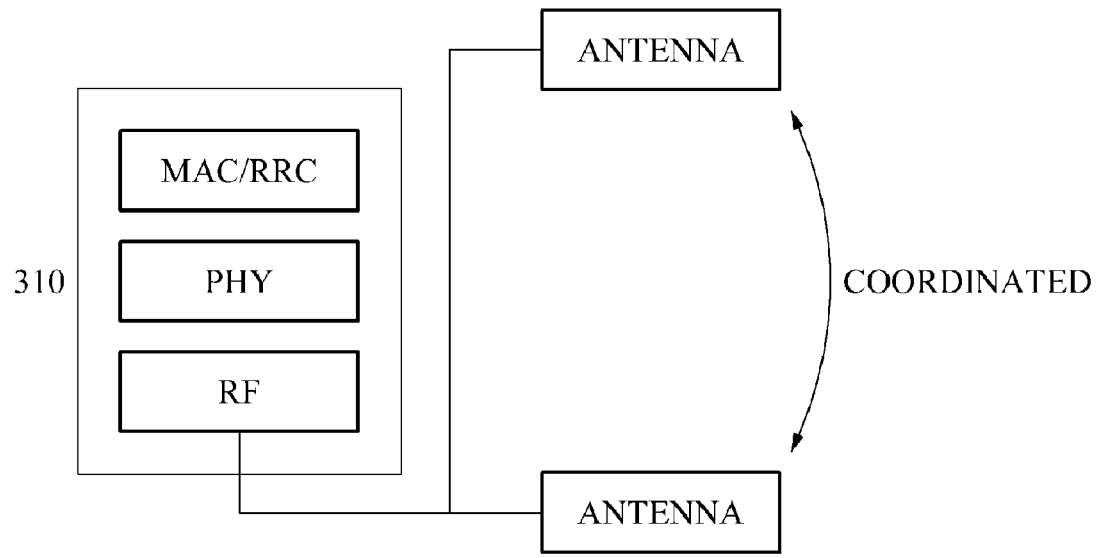
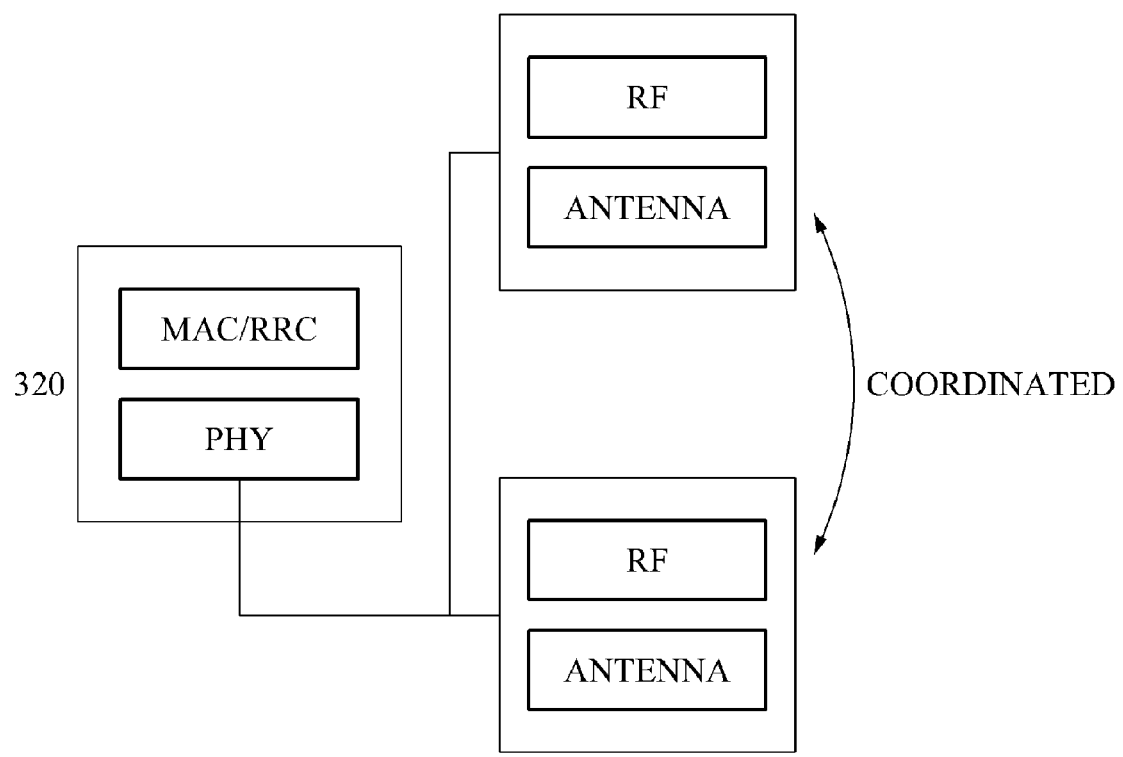

-LOAD AMOUNT IS UNIFORMLY DISTRIBUTED

-NO TERMINAL EXISTS IN PARTICULAR CELL

-REDUNDANT RADIO RESOURCES EXIST IN PARTICULAR CELL

FIG. 8

|  | FIRST PROCESSING MODULE | SECOND PROCESSING MODULE | LINK |
|---|---|---|---|
| EXAMPLE 1 | RRC, MAC, PHY | RF, ANTENNA | BASEBAND SIGNAL |
| EXAMPLE 2 | RRC, MAC, PHY, RF | ANTENNA | RF SIGNAL |

COMMUNICATION SYSTEM HAVING NETWORK ACCESS STRUCTURE

CROSS-REFERENCE TO RELATED APPLICATION(S)

This application claims the benefit under 35 U.S.C. §119(a) of a Korean Patent Application No. 10-2009-0102694, filed on Oct. 28, 2009, in the Korean Intellectual Property Office, the entire disclosure of which is incorporated herein by reference for all purposes.

BACKGROUND

1. Field

The following description relates to a communication system for an inter-cell cooperation, and more particularly, to a communication system having an improved network access structure in a multi-cell environment or a hierarchical cell environment.

2. Description of Related Art

Various technologies have been proposed to enhance performance of communication systems. Since there are constraints on improvements that may be obtained with respect to a single base station, the proposed technologies may enhance the system performance through an inter-cell cooperation.

A structure of a communication system for the inter-cell cooperation may vary; however, communication systems proposed generally include some limitations. For example, a relatively frequent demand for handover may result in a communication system having a relatively low efficiency in utilizing radio resources.

SUMMARY

In one general aspect, a central unit includes a central controller that forms at least one virtual cell by merging at least two cells among a plurality of cells of radio access units, or forms the at least one virtual cell by separating at least one cell among the plurality of the cells of the radio access units, first processing modules that perform signal processing in a radio resource control (RRC) layer, a media access control (MAC) layer, and a physical (PHY) layer for the at least one virtual cell, and a switch to connect the first processing modules to radio access units according to whether the cells of the radio access units are merged or are separate. Each of the radio access units includes a second processing module, and each of the second processing modules transmit and receive a radio frequency (RF) signal using at least one antenna.

The central controller may merge or separate the cells of the radio access units according to at least one condition selected from a group including a distribution of terminals served by the radio access units, statuses of channels formed between the radio access units and the terminals, a amount of traffic for the terminals, and any combination thereof.

The central controller may include a database to manage information associated with the statuses of the channels formed between the radio access units and the terminals, and to manage information associated with the amount of traffic.

The central controller may include a mobility manager to gather information associated with a mobility of the terminals.

The central controller may include a virtual cell manager to manage and control the at least one virtual cell.

The central controller may include an inter-cell interference coordinator to control interference occurring in the at least one virtual cell.

The central controller may include a quality of service (QoS) manager to manage a requested QoS or a priority of the terminals.

If a single particular virtual cell is formed based on a cell of a particular radio access unit, the switch may connect a second processing module included in the particular radio access unit to one of the first processing modules.

If a cell of a first radio access unit and a cell of a second radio access unit are merged into a single virtual cell, the switch may connect a second processing module included in the first radio access unit and a second processing module included in the second radio access unit to one of the first processing modules.

An RF module to convert between the RF signal and a baseband signal may be included in at least one of the first processing modules and the second processing modules.

The radio access units and the central unit may transmit or receive the RF signal or the baseband signal.

If a particular radio access unit includes both a first processing module and a second processing module, the switch may directly connect the particular radio access unit to the central controller.

If the particular radio access unit and another radio access unit that includes a second processing module are merged with each other to form a single virtual cell, the switch may connect the second processing module included in the particular radio access unit and the second processing module included in the another radio access unit to one of the first processing modules.

If the first processing module included in the particular radio access unit is connected to a second processing module included in another radio access unit so that the particular radio access unit and the other radio access unit form a single virtual cell, the switch may directly connect the first processing module included in the particular radio access unit and the second processing module included in the another radio access unit to the central controller.

The central unit may be connected to another central unit.

A cell of a particular radio access unit associated with the central unit may be merged with a cell of another radio access unit associated with the another central unit to form a virtual cell.

In another general aspect, a method of operating a terminal includes transmitting, to at least one of a plurality of radio access units, information associated with at least one condition selected from a group including a data rate requested by the terminal, a requested QoS, a channel status, an interference amount, and any combination thereof, receiving, from at least one of the plurality of radio access units, information associated with a virtual cell, the virtual cell formed by merging cells of the plurality of radio access units or by separating the cells of the plurality of radio access units for cooperative communication with respect to the terminal, and performing an initialization for communication with the plurality of radio access units in the virtual cell.

Information associated with the virtual cell may include an identifier of the virtual cell.

The method may further include requesting a merging or separating of the cells of the plurality of radio access units.

In another general aspect, a computer-readable medium may store a program to implement a method of operating a terminal including transmitting, to at least one of a plurality of radio access units, information associated with at least one condition selected from a group including a data rate requested by the terminal, a requested QoS, a channel status, an interference amount, and any combination thereof, receiving, from at least one of the plurality of radio access units, information associated with a virtual cell, the virtual cell formed by merging cells of the plurality of radio access units or by separating the cells of the plurality of radio access units for cooperative communication with respect to the terminal, and performing an initialization for communication with the plurality of radio access units in the virtual cell.

According to certain examples, a frequency of handovers may be decreased, and a utilization efficiency of radio resources may be enhanced by appropriately forming a virtual cell.

According to certain examples, a communication system may have an improved network access structure by appropriately providing first processing modules and second processing modules to a central unit or radio access units.

Other features and aspects will be apparent from the following detailed description, the drawings, and the claims.

BRIEF DESCRIPTION OF THE DRAWINGS

FIG. 3 is a diagram illustrating an example of a cooperative communication, where a distributed antenna system (DAS) and a remote radio head (RRH) are provided, according to a related art.

FIG. 8 is a diagram illustrating examples of functions included in a first processing module and a second processing module.

Figure 1:
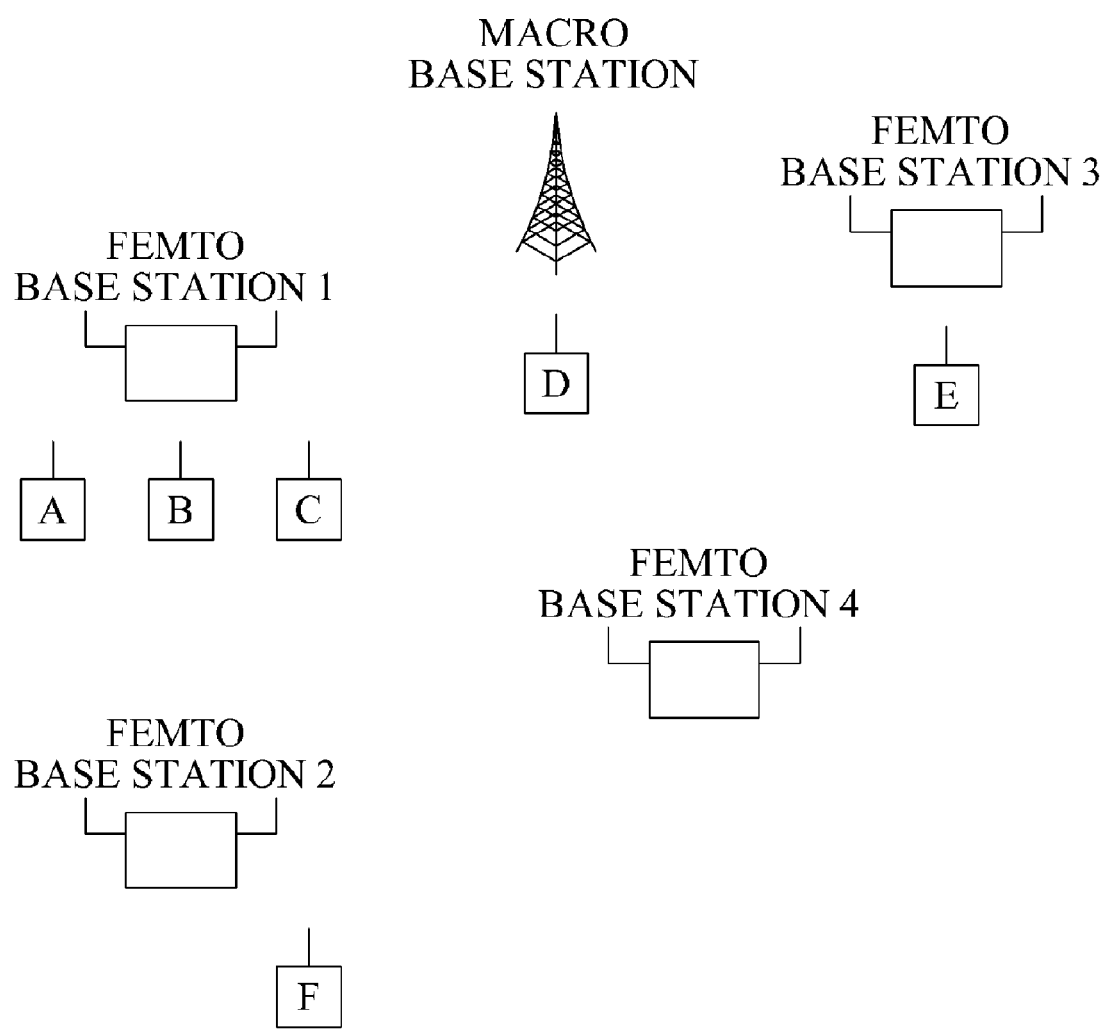
FIG. 1 is a diagram illustrating an example of a multi-cell or hierarchical cell communication system, according to a related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a multi-cell or hierarchical cell communication system, according to a related art.

Referring to FIG. 1, a multi-cell or hierarchical cell communication system may include a macro base station, femto base stations 1, 2, 3, and 4, and terminals A, B, C, D, E, and F. The femto base stations 1, 2, 3, and 4 may be substituted with various similar types of apparatuses, for example, relay stations, pico base stations, and the like.

Generally, since a femto base station typically has a small cell coverage, the number of terminals included in each of the femto cells and a load occurring in each of the femto cells may be different. For example, in FIG. 1, three terminals, for example, the terminals A, B, and C are associated with the femto base station 1, and no terminal is associated with the femto base station 4.

A femto cell using a relatively large amount of radio resources may be present, whereas a femto base station having sufficient redundant resources may also be present. For example, radio resources may be insufficient in the cell of the femto base station 1, and the cells of the femto base stations 2, 3, and 4 may have unused radio resources. In this example, a method for utilizing the unused radio resources may be implemented for load balancing.

A terminal having a poor channel status may be present, and a cooperative communication may be performed to increase a transmission capacity of the terminal. For example, if a status of a channel formed between the terminal E and the femto base station 3 is poor, the femto base station 4 may cooperate with the femto base station 3 to increase the transmission capacity of terminal E.

Since femto cells have a relatively small cell coverage in the multi-cell communication system, handover may occur relatively frequently. Frequent handovers may increase overhead in the multi-cell communication system. Accordingly, it may be preferable to reduce the frequency of handovers.

Figure 2:
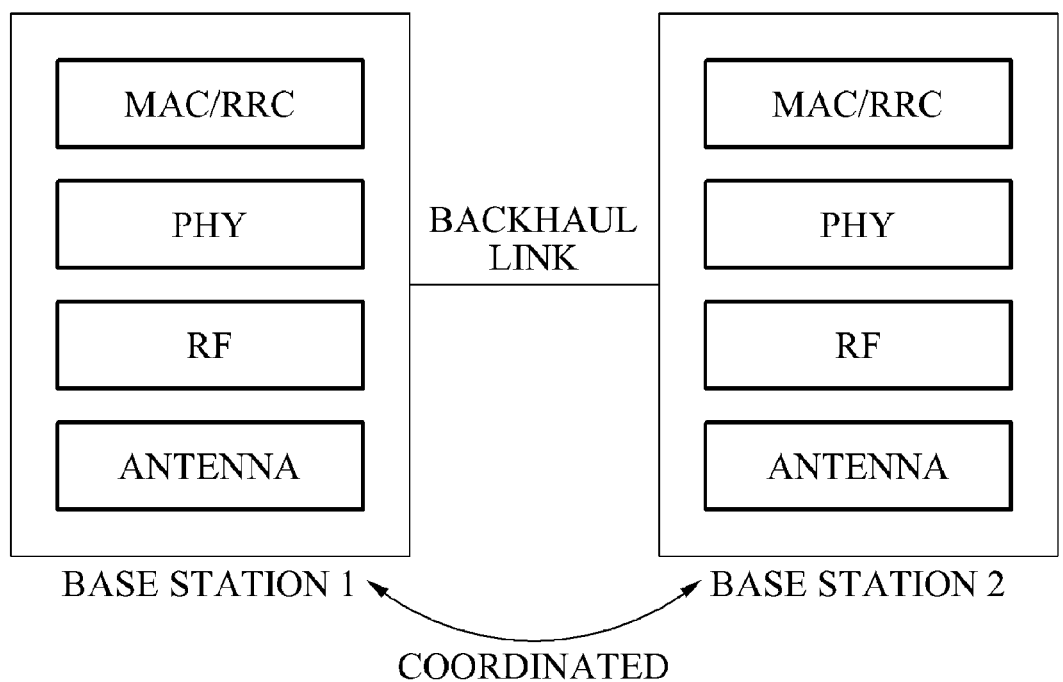
FIG. 2 is a diagram illustrating an example of a cooperative communication, where two base stations utilize a coordinated multi-point transmission/reception (CoMP) scheme, according to a related art.

FIG. 2 illustrates an example of a cooperative communication, where a first base station (BS1) and a second base station (BS2) utilize a coordinated multi-point transmission/reception (CoMP) scheme, according to a related art.

Referring to FIG. 2, BS1 and BS2 cooperate with each other according to the CoMP scheme, and are connected to each other via a backhaul link. Each of BS1 and BS2 includes a processing module for performing signal processing in a radio resource control (RRC) layer, a processing module for performing signal processing in a media access control (MAC) layer, a processing module for performing signal processing in a physical (PHY) layer, and a radio frequency (RF) module for performing a conversion between an RF signal and a baseband signal, and an antenna module. Further, BS1 and BS2 may independently include the aforementioned modules.

However, adaptively coping with a distribution of terminals and a distribution of a load in multiple cells may present difficulties if only a CoMP scheme is implemented. A moving terminal may increase a handover frequency.

FIG. 3 illustrates an example of a cooperative communication, where a distributed antenna system (DAS) 310 and a remote radio head (RRH) 320 are provided, according to a related art.

The DAS 310 includes antenna modules that are physically separate from each other. The DAS 310 may reduce inter-cell interference by applying a distributed multiple input multiple output (MIMO) communication method to the separate antenna modules.

The RRH 320 includes a baseband unit with a processing module for performing signal processing in an RRC layer and a processing module for performing signal processing in a PHY layer. The RRH 320 also includes two RF antenna units that may be physically separate from each other. Each of the two RF antenna units includes an RF module and an antenna module.

The DAS 310 and the RRH 320 may be provided by simply expanding a single base station. Accordingly, the DAS 310 and the RRH 320 may be prevented from achieving a performance greater than a maximum performance of the single base station.

As described above, the CoMP scheme, the DAS 310, and the RRH 320 may present various limitations or difficulties in implementation. Hereinafter, a communication system designed to substantially overcome these limitations and difficulties is described.

Examples including a virtual cell formed by separating or merging cells are described below, with reference to FIG. 4 through FIG. 6. Operations of a central unit and radio access units are described below with reference to FIG. 7 through FIG. 14.

Figure 4:
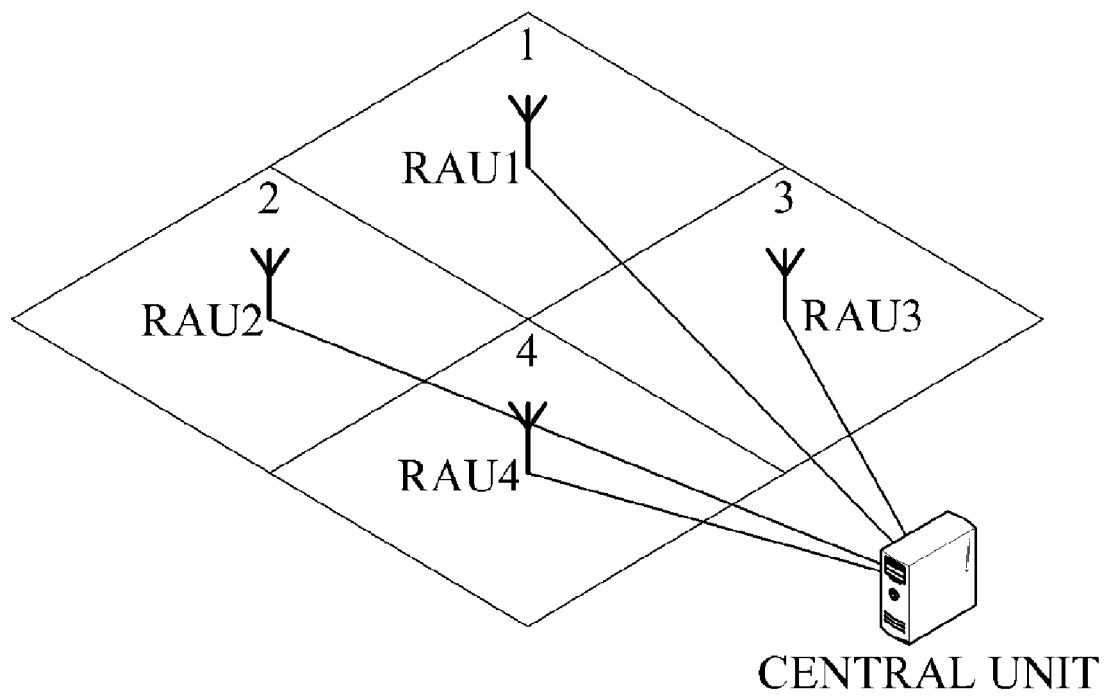
FIG. 4 is a diagram illustrating an example of a load being uniformly distributed among cells in a multi-cell communication system including radio access units and a central unit.

Separate Cell:

FIG. 4 illustrates an example of a load being uniformly distributed among cells 1, 2, 3, and 4 in a multi-cell communication system including radio access units (RAU1, RAU2, RAU3, and RAU4) and a central unit.

Referring to FIG. 4, RAU1, RAU2, RAU3, and RAU4 are each connected to the central unit, and each of RAU1, RAU2, RAU3, and RAU4 forms a single physical cell. For example, RAU1, RAU2, RAU3, and RAU4 may form the cells 1, 2, 3, and 4, respectively. The virtual cell may be formed by the cells 1, 2, 3, and 4 either being merged with each other or being separated from each other. In FIG. 4, the cells 1, 2, 3, and 4 are separate from each other and form a single virtual cell. However, even if a uniform load is distributed in the cells 1, 2, 3, and 4, the virtual cell may be formed by the cells 1, 2, 3, and 4 of RAU1, RAU2, RAU3, and RAU4 being merged with each other.

Figure 5:
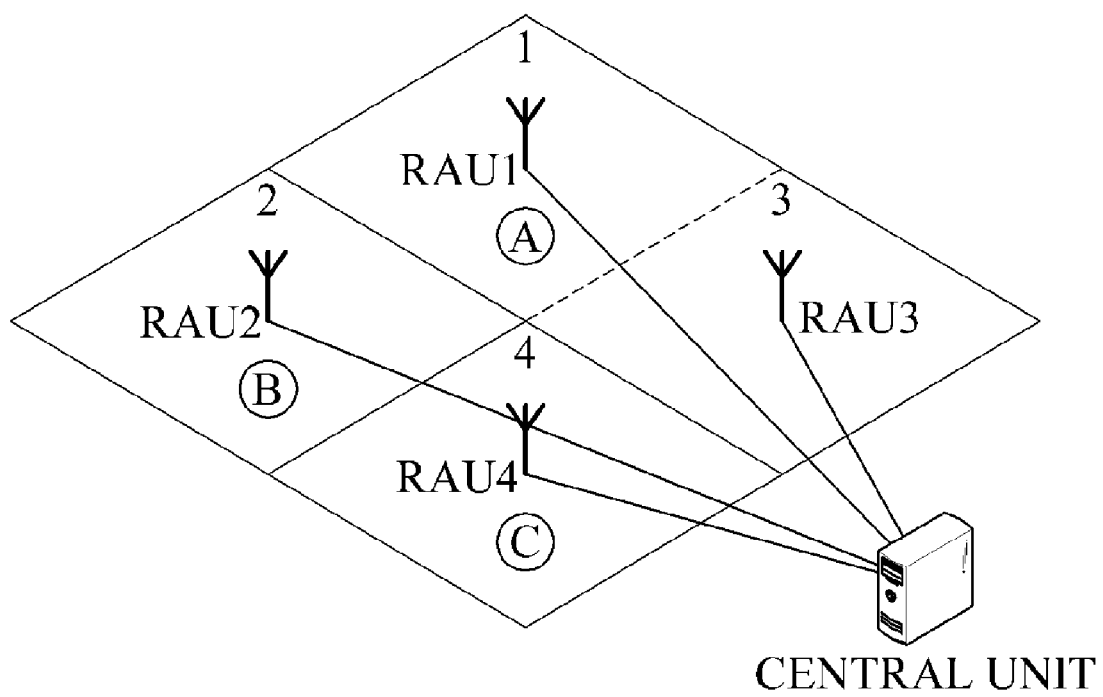
FIG. 5 is a diagram illustrating an example of a terminal being absent in a particular cell in a multi-cell communication system.

Merged Cell:

FIG. 5 illustrates an example of a terminal being absent in a particular cell in a multi-cell communication system, for example, a cell 3 of RAU3.

Referring to FIG. 5, similar to FIG. 4, RAU1, RAU2, RAU3, and RAU4 are connected to a central unit, and each of RAU1, RAU2, RAU3, and RAU4 forms a single cell.

Terminals A, B, and C are located within cells 1, 2, and 4, respectively; however, no terminal is present in the cell 3. In this example, the cell 1 and the cell 3 may be merged with each other to form a single virtual cell. A dotted line of FIG. 5 indicates the merged cell.

RAU3 may serve the terminal A in cooperation with RAU1 to increase a capacity of data transmitted to or from the terminal A. In particular, if a channel status of the terminal A is poor, or if the terminal A requests a high quality of service (QoS) or a high data rate, RAU3 may cooperate with RAU1 to improve data transmission.

In particular, if the cell 1 and the cell 3 are merged into the single virtual cell and the terminal A moves to the cell 3, handover may not occur. Handover may not be necessary, because a single identifier is utilized for the virtual cell formed by merging the cell 1 and the cell 3.

Figure 6:
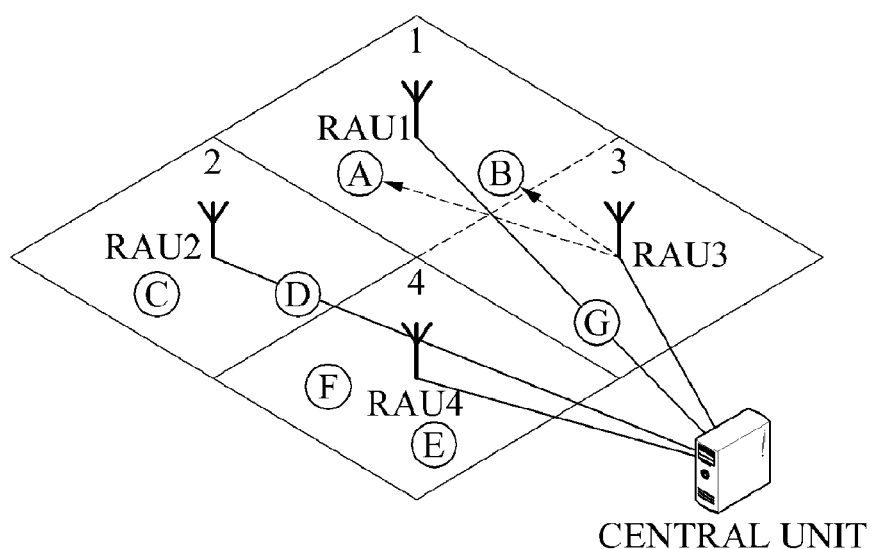
FIG. 6 is a diagram illustrating an example of a relatively small load being distributed in a particular cell in a multi-cell communication system.

Partially Merged Cell:

FIG. 6 illustrates an example of a relatively small load being distributed in a particular cell in a multi-cell communication system.

Referring to FIG. 6, two terminals are located within in each of cells 1, 2, and 4; however, a single terminal is present in a cell 3. In this example, terminals A and B are located within the cell 1, terminals C and D are located within in the cell 2, terminals E and F are located within in the cell 4, and a terminal G is located within in the cell 3.

If each of the terminals A, B, C, D, E, F, and G provide similar loads, a relatively small load may be distributed in the cell 3 compared to the cells 1, 2, and 4. Accordingly, the cell 3 may have surplus radio resources. In this example, RAU3 may serve the terminal G and may also use the surplus radio resources to serve the terminals A and B, together with RAU1.

The terminals A and B may operate as if the cell 1 and the cell 3 are merged into a single cell. The terminal G may operate as if the cell 1 and the cell 3 are independent from each other.

Figure 7:
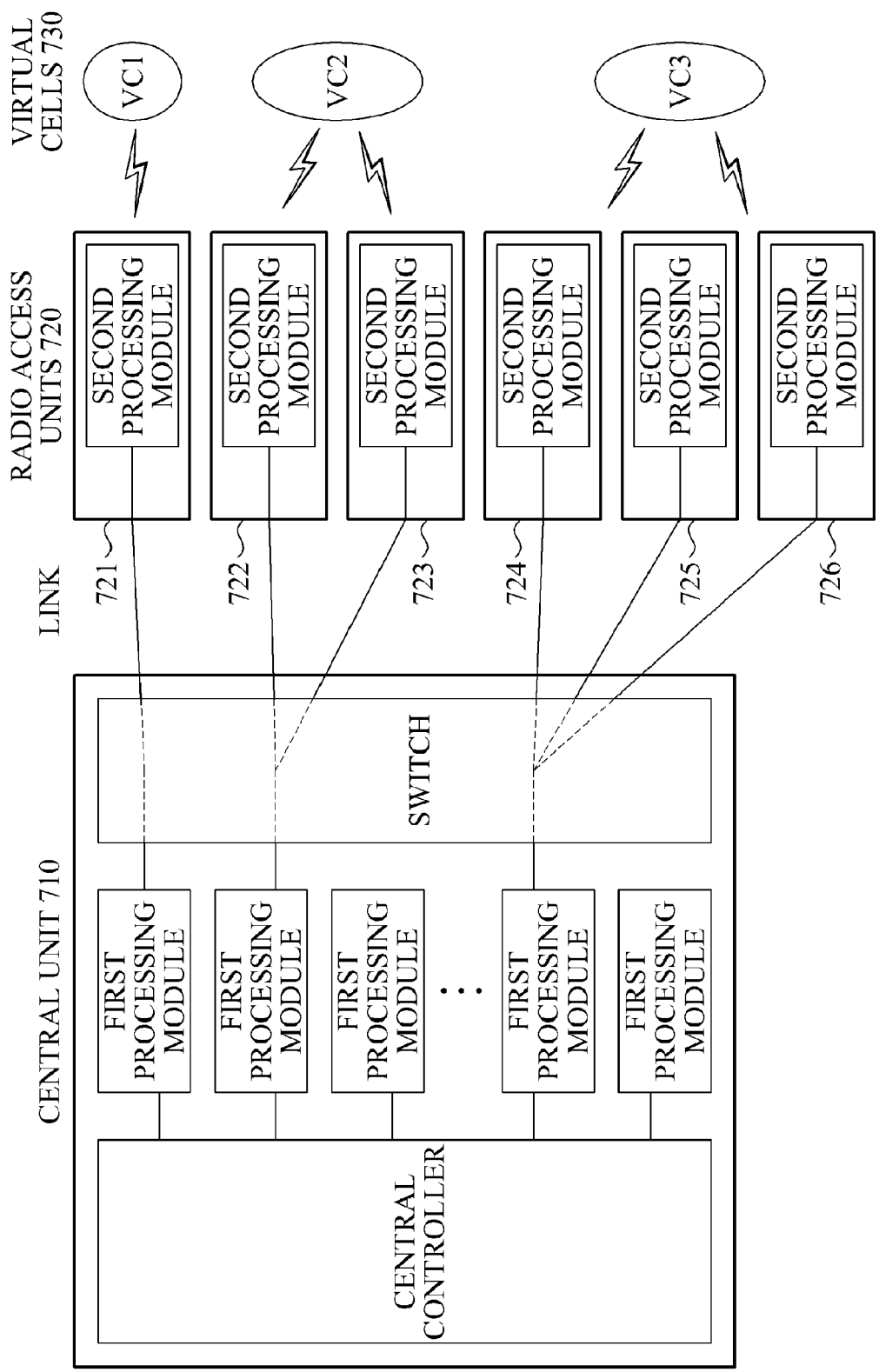
FIG. 7 is a block diagram illustrating examples of a central unit, radio access units, and virtual cells.

FIG. 7 illustrates examples of a central unit 710, radio access units 720, and virtual cells 730.

FIG. 8 illustrates examples of functions included in a first processing module and a second processing module.

Referring to FIG. 7, the central unit 710 includes a central controller, first processing modules, and a switch. Each of the radio access units 720 includes a second processing module. The virtual cells 730 may be formed by the radio access units 720 either being merged with each other or being separated from each other. For example, a radio access unit 721 may independently form a virtual cell 1 (VC1). A radio access unit 722 and a radio access unit 723 may be merged with each other to form a virtual cell 2 (VC2). A radio access unit 724, a radio access unit 725, and a radio access unit 726 may be merged with each other to form a virtual cell 3 (VC3).

Referring to FIG. 8, the first processing module and the second processing module may perform different functions.

According to an example 1, the first processing module performs signal processing in an RRC layer, a MAC layer, and a PHY layer. The second processing module includes an RF module to convert between an RF signal and a baseband signal and an antenna module to transmit and receive the RF signal. According to the example 1, the baseband signal may pass through a link between the first processing module and the second processing module.

According to an example 2, the first processing module performs signal processing in the RRC layer, the MAC layer, and the PHY layer, and also includes the RF module. The second processing module includes only the antenna module. An RF signal may pass through a link between the first processing module and the second processing module.

Referring again to FIG. 7, the central controller of the central unit 710 may form at least one virtual cell by merging at least two cells among cells of the radio access units 720 for cooperative communication. For example, the central controller may form VC2 by merging the radio access unit 722 and the radio access unit 723. In addition, the central controller may form VC3 by merging the radio access unit 724, the radio access unit 725, and the radio access unit 726.

The central controller may also separate the cells of the radio access units 720. For example, VC1 indicates a separate cell.

The central controller may merge or separate the cells of the radio access units 720 based on at least one of: a distribution of terminals served by the radio access units 720, statuses of channels formed between the radio access units 720 and the terminals, and an amount of traffic for the terminals. For example, the central controller may form the virtual cells 730 to decrease a frequency of handovers of the terminals, to satisfy a requested QoS of the terminals, or to increase a utilization efficiency of radio resources.

If the virtual cells 730 are formed using the central controller of the central unit 710, the switch of the central unit 710 may appropriately connect the first processing modules included in the central unit 710 and the second processing modules of radio access units 720. For example, since the radio access unit 721 forms VC1 as a separate cell, the switch connects the second processing module included in the radio access unit 721 to one of the first processing modules included in the central unit 710. Since the radio access unit 722 and the radio access unit 723 are merged to form VC2, the switch connects the second processing module included in the radio access unit 722 and the second processing module included in the radio access unit 723 to one of the first processing modules. Since the radio access unit 724, the radio access unit 725, and the radio access unit 726 are merged to form VC3, the switch connects the second processing module included in the radio access unit 724, the second processing module included in the radio access unit 725, and the second processing module included in the radio access unit 726 to one of the first processing modules.

The second processing modules and the respective first processing modules connected thereto may operate as a single base station. For example, the second processing module included in the radio access unit 724, the second processing module included in the radio access unit 725, and the second processing module included in the radio access unit 726, and the respective first processing module connected thereto may operate as a single base station in VC3. Similarly, the second processing module included in the radio access unit 722, the second processing module included in the radio access unit 723, and the respective first processing module connected thereto may operate as a single base station in VC2.

Figure 9:
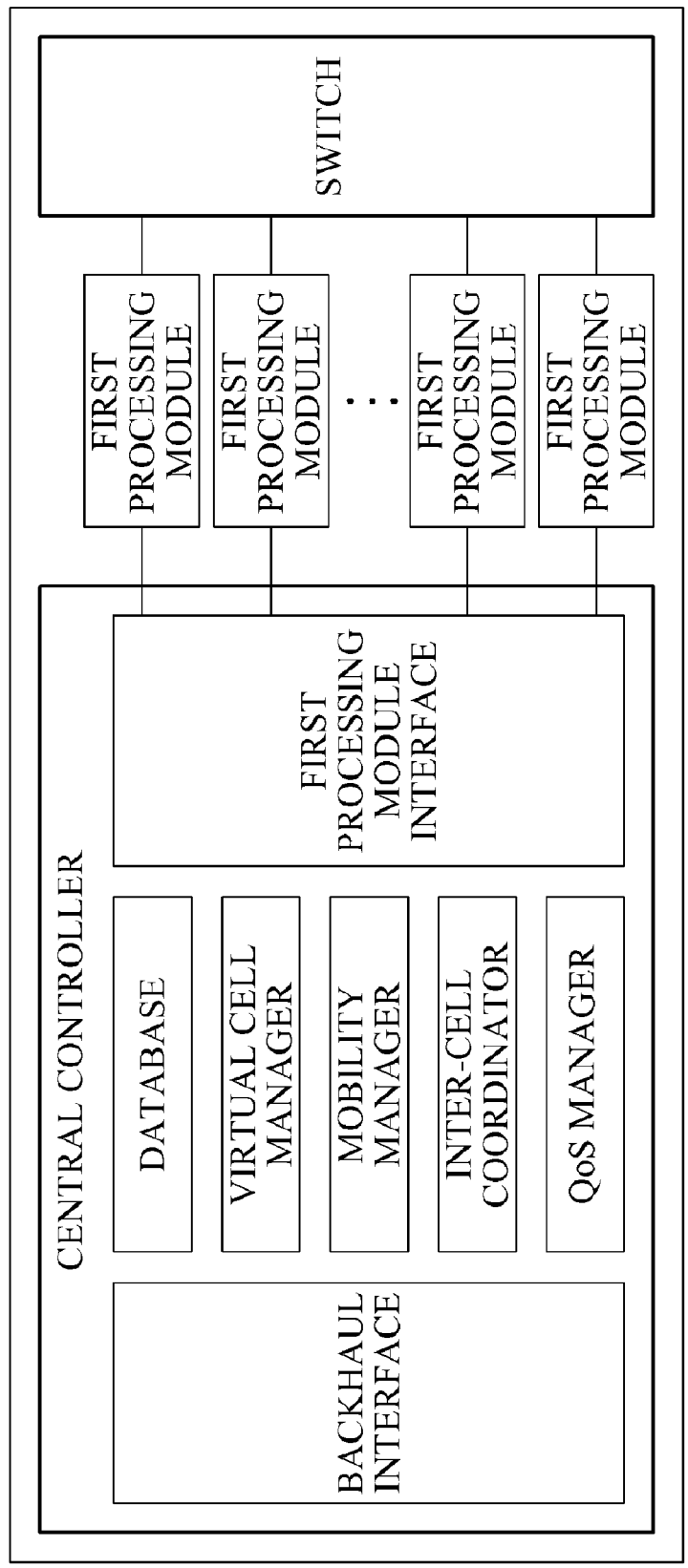
FIG. 9 is a block diagram illustrating an example of a central unit.

FIG. 9 illustrates an example of a central unit.

Referring to FIG. 9, the central unit includes a backhaul interface, a database, a virtual cell manager, a mobility manager, an inter-cell interference coordinator, a QoS manager, a first processing module interface, first processing modules, and a switch.

The backhaul interface may provide an interface to communicate with another central unit over a wired or wireless network.

The database may store and manage information associated with statuses of channels formed between radio access units and terminals, and information associated with an amount of traffic for the terminals. Additionally, database may store and manage information associated with a distribution of the terminals served by the radio access units, for example, information associated with locations of the terminals. Information stored in the database may be used to form virtual cells or to apply interference control technologies.

The virtual cell manager may manage virtual cells. For example, the virtual cell manager may manage identifiers of the virtual cells, changes in the virtual cells, and the like.

The mobility manager may gather information associated with the mobility of the terminals between the virtual cells, information associated with a relative location change of a terminal, and the like.

The inter-cell coordinator may control interference occurring among the virtual cells. In particular, the inter-cell coordinator may select one of a variety of interference control technologies, for example, a transmit power control technology, an interference alignment technology, a multi-cell MIMO technology, and the like, and implement the selected interference control technology.

The QoS manager may manage a requested QoS or a priority of the terminals. For example, the requested QoS and the priority of the terminals may be different for each terminal. Accordingly, the QoS manager may store and manage information associated with the requested QoS and the priority of the terminals. The stored information may be utilized to select one of the interference control technologies or to form the virtual cells.

Figure 10:
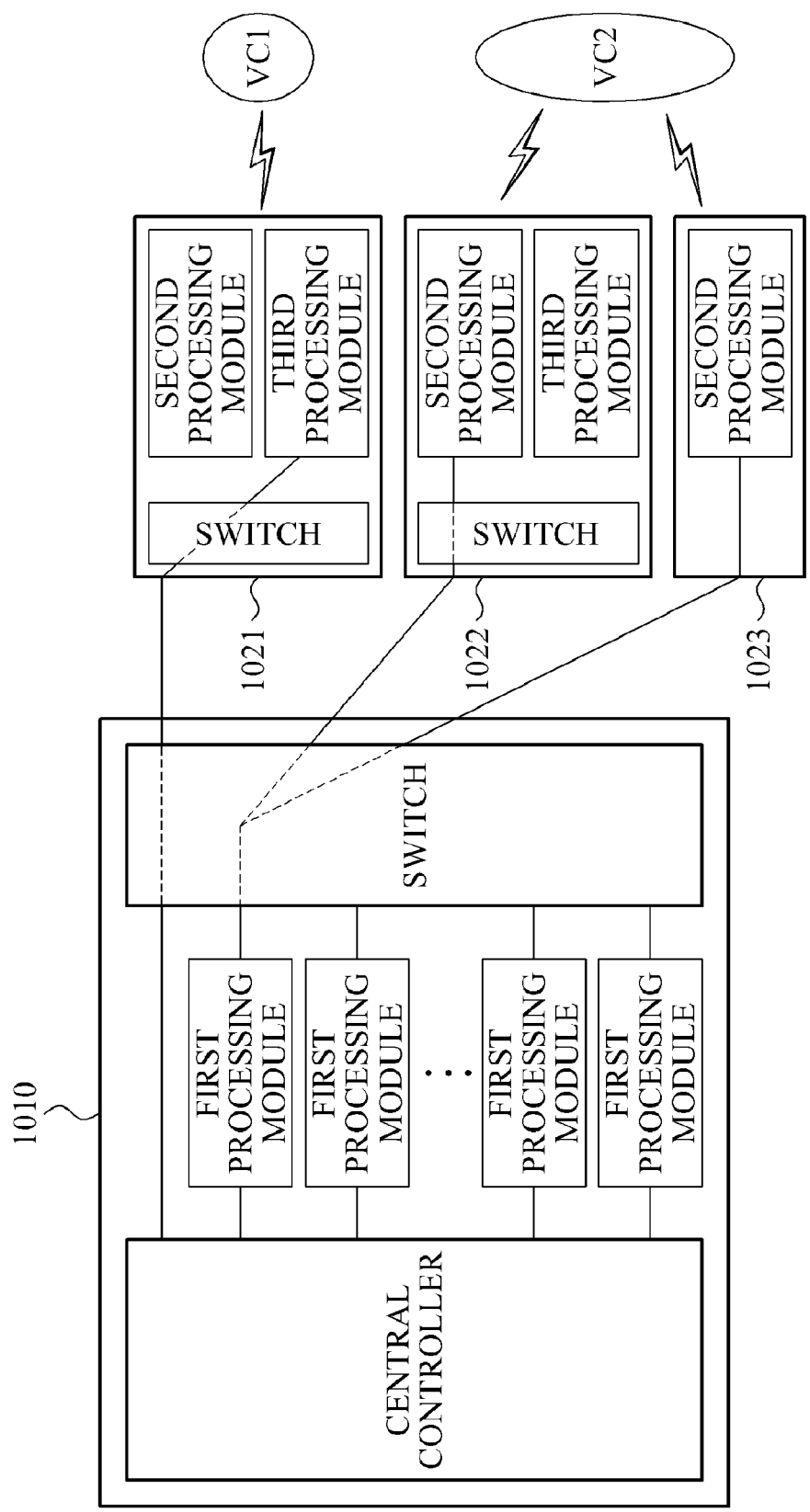
FIG. 10 is a diagram illustrating an example of a relationship between a central unit and radio access units, where a radio access unit includes a third processing module and the third processing module performs both a function of a first processing module and a function of a second processing module.

FIG. 10 illustrates an example of a relationship between a central unit 1010 and radio access units 1021, 1022, and 1023, where a radio access unit includes a third processing module and the third processing module performs both a function of a first processing module and a function of a second processing module.

Referring to FIG. 10, the radio access unit 1021 and the radio access unit 1022 each include the third processing module. In this example, the radio access unit 1023 does not include the third processing module. The third processing module may perform both the function of the first processing module and the function of the second processing module. For example, the third processing module may perform signal processing in an RRC layer, a MAC layer, and a PHY layer, and the third processing module may also include an RF module and an antenna module to transmit and receive an RF signal. A radio access unit operating using the third processing module may operate as a single independent base station, and may perform the same or similar functions as a pico base station or a femto base station.

The radio access unit 1021 forms a single virtual cell 1 (VC1) as a separate cell. The radio access unit 1021 includes the third processing module; therefore, there is no need to connect the radio access unit 1021 to one of the first processing modules included in the central unit 1010. Accordingly, the switch of the central unit 1010 may directly connect the radio access unit 1021 to a central controller of the central unit 1010.

The radio access unit 1022 and the radio access unit 1023 are merged with each other to form a single virtual cell 2 (VC2). The switch of the central unit 1010 may connect a second processing module included in the radio access unit 1022 and a second processing module included in the radio access unit 1023 to one of the first processing modules. In this example, the second processing module of the radio access unit 1022 and the second processing module of the radio access unit 1023, together with the first processing module connected thereto, may cooperate with each other to function as an actual base station in VC2.

Figure 11:
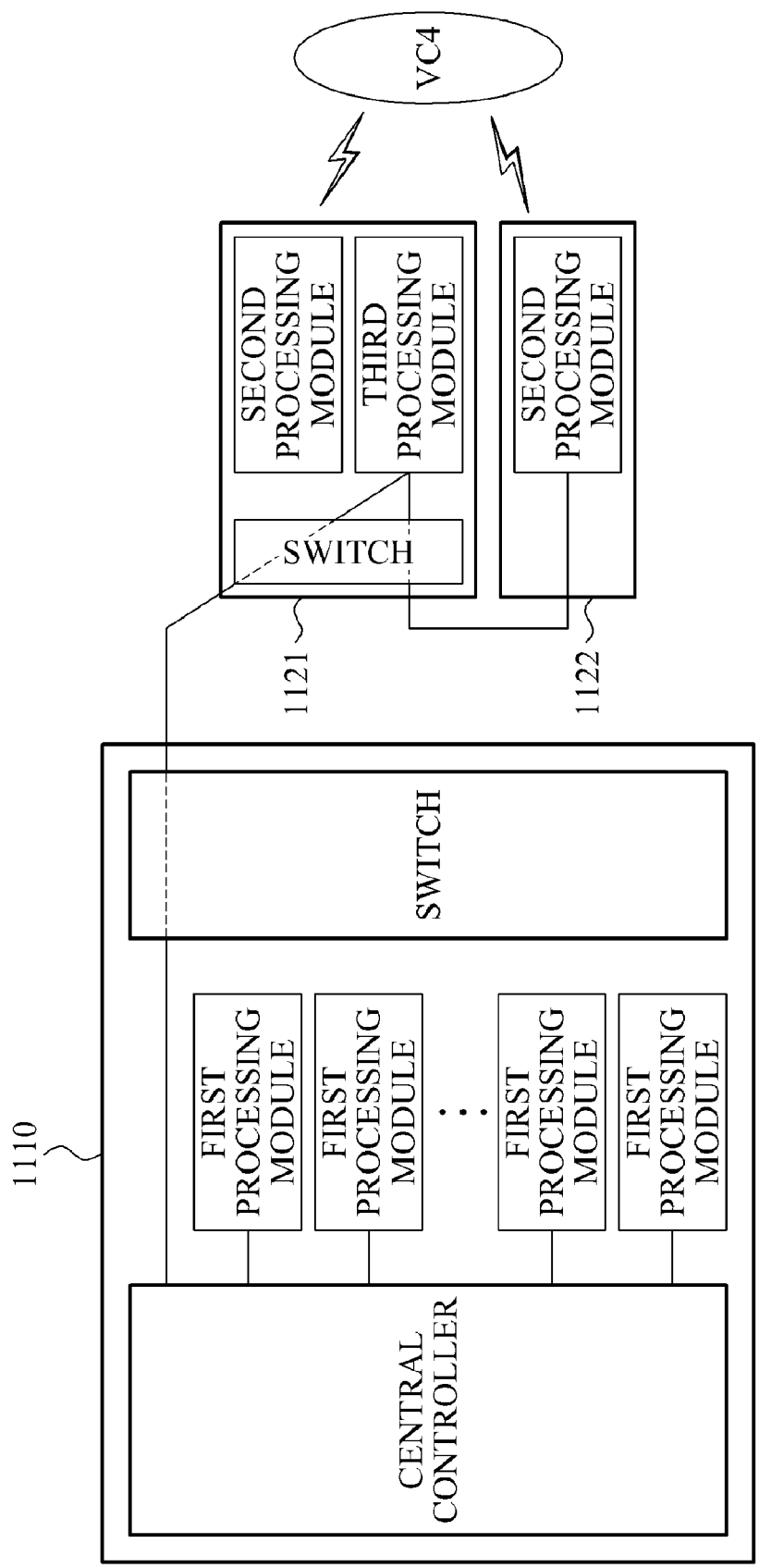
FIG. 11 is a diagram illustrating an example of a relationship between a central unit and radio access units where a radio access unit includes a third processing module for performing a function of a first processing module for another radio access unit, and the third processing module performs both the function of the first processing module and a function of a second processing module.

FIG. 11 illustrates an example of a relationship between a central unit 1110 and radio access units 1121 and 1122, where a radio access unit includes a third processing module for performing a function of a first processing module for another radio access unit, and the third processing module performs both the function of the first processing module and a function of a second processing module.

Referring to FIG. 11, the radio access unit 1121 includes the second processing module and the third processing module, and the radio access unit 1122 includes only the second processing module. The radio access unit 1121 operates as a master, and the radio access unit 1122 operates as a slave.

For example, the third processing module included in the radio access unit 1121 may provide the functionality of a first processing module for the radio access unit 1122, in place of the central unit 1110. The second processing module of the radio access unit 1122 and the third processing module of the radio access unit 1121 may be connected to each other via a switch of the central unit 1110. The third processing module of the radio access unit 1121 may be connected to a central controller via the switch.

That is, the radio access unit 1121 and the radio access unit 1122 may cooperate with each other to function as a base station in a virtual cell 4 (VC4), without using the first processing modules of the central unit 1110.

According to an embodiment, the radio access unit 1121 may include a module to provide the functionality of the central controller. In this example, the central unit 1110 and the radio access unit 1121 may be disconnected from each other.

Figure 12:
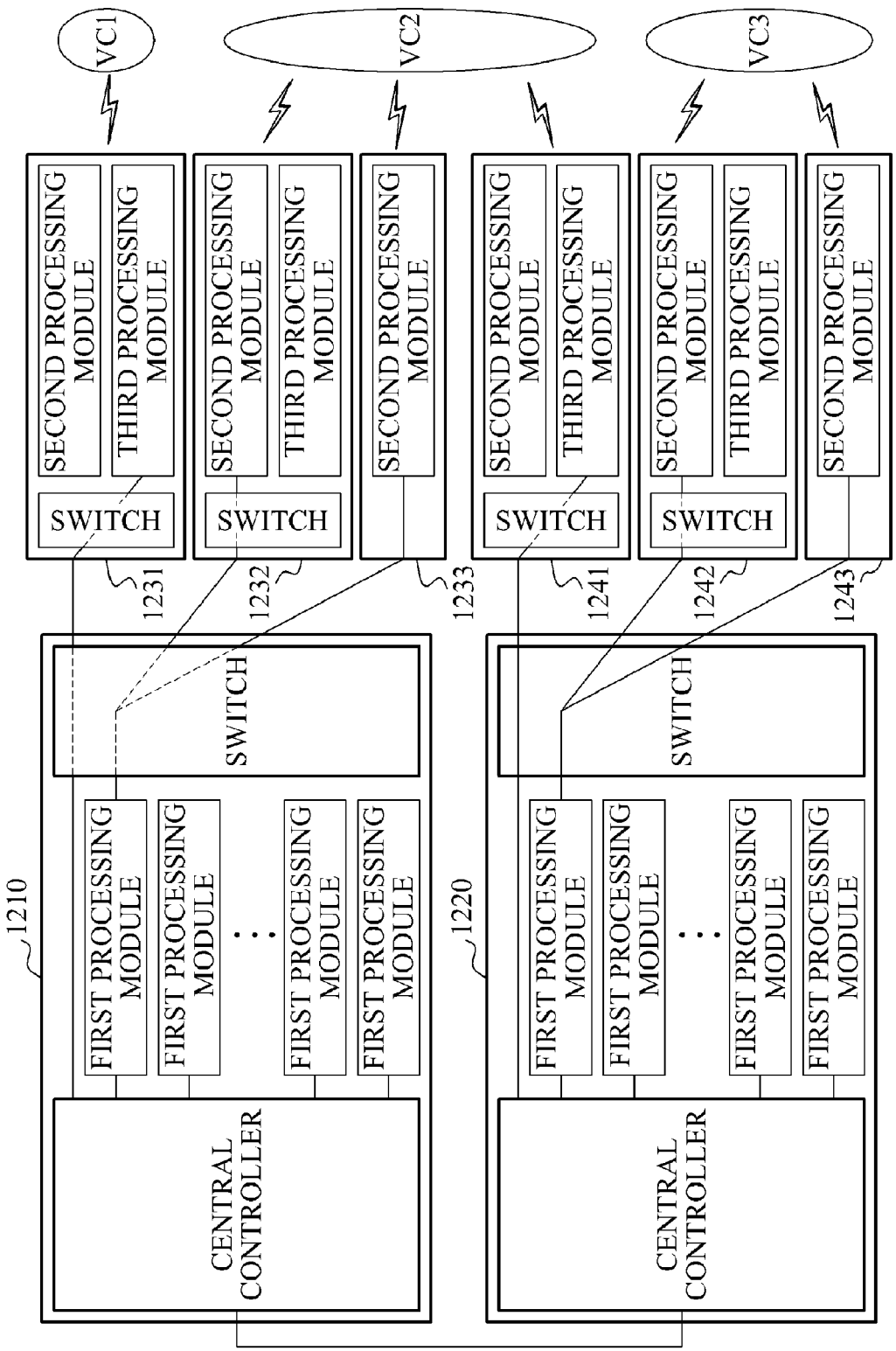
FIG. 12 is a diagram illustrating an example of a communication system including two central units connected to each other to form virtual cells.

FIG. 12 illustrates an example of a communication system including two central units 1210 and 1220 connected to each other to form virtual cells.

Referring to FIG. 12, the two central units 1210 and 1220 are connected to each other to perform operations for the virtual cells.

A radio access unit 1231 forms a virtual cell (VC1) as a separate cell. The radio access unit 1231 includes a third processing module and may operate as an independent base station. The radio access unit 1231 may also be directly connected to a central controller of the central unit 1210, via a switch of the central unit 1210.

A radio access unit 1232, a radio access unit 1233, and a radio access unit 1241 may be merged with each other to form a single virtual cell 2 (VC2). In this example, a second processing module included in the radio access unit 1232 and a second processing module included in the radio access unit 1233 may be connected to one of first processing modules included in the central unit 1210, via the switch of the central unit 1210. The radio access unit 1241 includes the third processing module and may be directly connected to a central controller of the central unit 1220. The radio access unit 1232 and the radio access unit 1233 may operate as a single independent base station. The radio access unit 1241 may operate as another independent base station. Since each of the independent base stations is connected to one of the central units 1210 and 1220, and the central units 1210 and 1220 are connected to each other, VC2 formed by merging the three radio access units 1232, 1233, and 1241 may be regarded as being formed based on two independent base stations.

A radio access unit 1242 and a radio access unit 1243 may be merged with each other to form a virtual cell 3 (VC3). A second processing module included in the radio access unit 1242 and a second processing module included in the radio access unit 1243 may be connected to one of first processing modules included in the central unit 1220.

Figure 13:
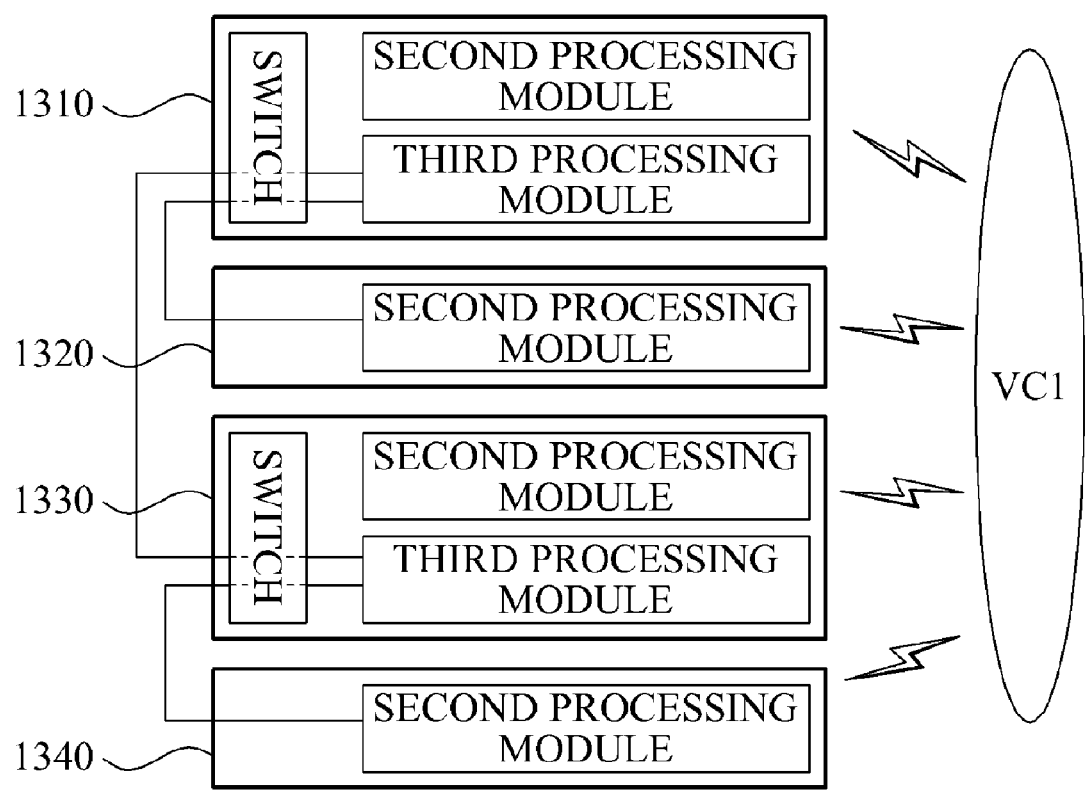
FIG. 13 is a diagram illustrating an example of a communication system including radio access units that perform a function of a central unit, without employing the central unit.

FIG. 13 illustrates an example of a communication system including radio access units 1310, 1320, 1330, and 1340 that perform a function of a central unit, without employing the central unit.

In this example, it is assumed that at least one of the radio access unit 1310 and the radio access unit 1330 is designed to include functionality of the central unit.

Referring to FIG. 13, without employing the central unit, the four radio access units 1310, 1320, 1330, and 1340 are merged with each other to form a single virtual cell 1 (VC1). The radio access unit 1310 and the radio access unit 1330 operate as a master with respect to the radio access unit 1320 and the radio access unit 1340, respectively.

The radio access unit 1310 and the radio access unit 1320 may be merged with each other to function as a single independent base station. The radio access unit 1330 and the radio access unit 1340 may also be merged with each other to function as another independent base station. The two independent base stations may be merged with each other to form the single virtual cell (VC1).

Figure 14:
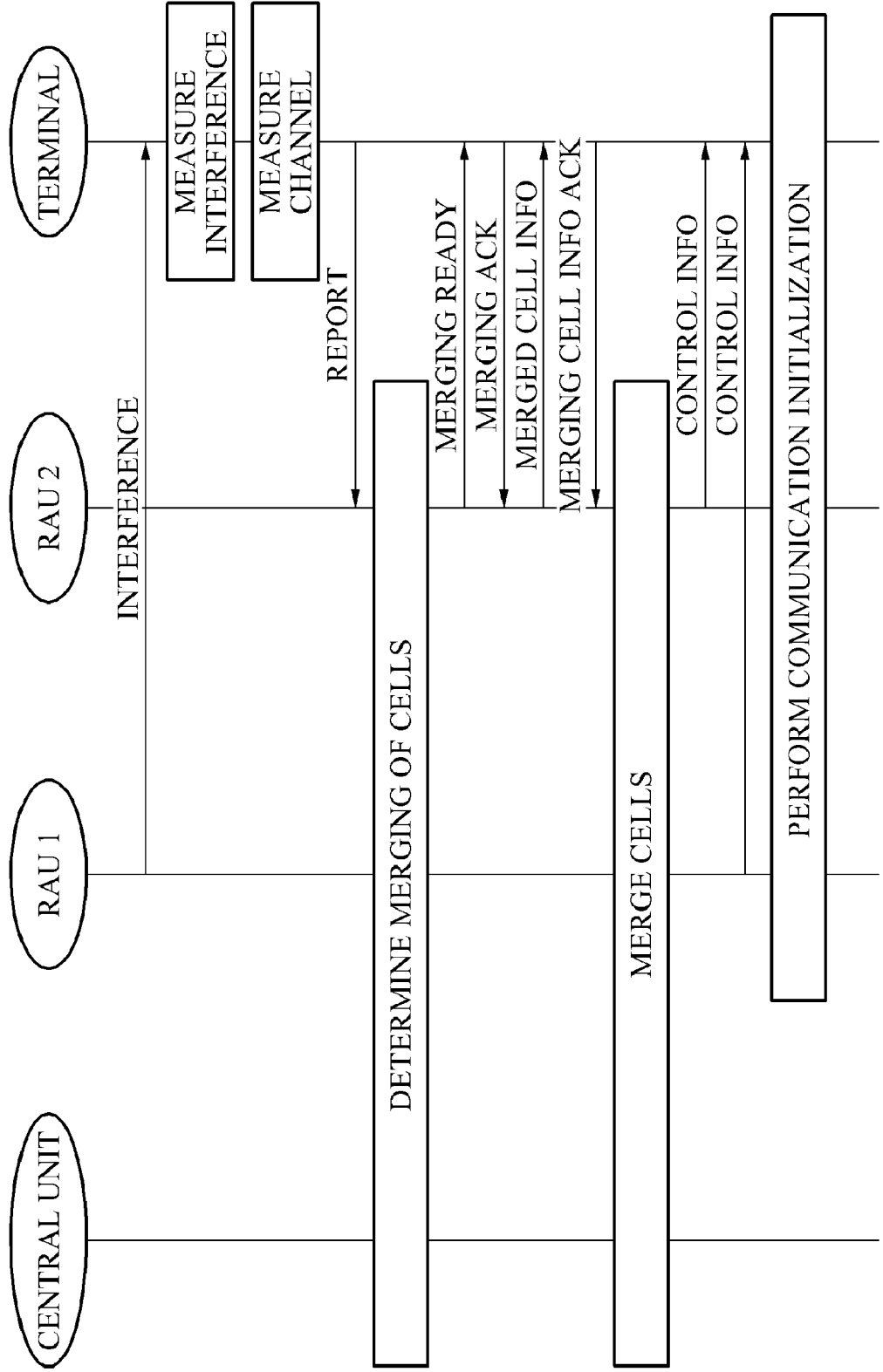
FIG. 14 is a diagram illustrating an example of a method of operating a communication system.

FIG. 14 illustrates an example of a method of operating a communication system.

In this example, it is assumed that a terminal is located within a cell associated with RAU2.

Referring to FIG. 14, a radio access unit 1 (RAU1) affects interference at the terminal. The terminal measures the interference caused by RAU1. The terminal also measures a channel between a radio access unit 2 (RAU2) and the terminal.

The terminal reports to RAU2 information regarding a data rate requested by the terminal, a requested QoS, a status of the channel formed between RAU and the terminal, and a measurement of interference caused by RAU1.

Where the above information is gathered, at least one of a central unit, RAU1, and RAU2 may determine whether to merge a cell of RAU1 and a cell of RAU2 into a single virtual cell, or whether to separate the cell of RAU1 and the cell of RAU2 into two virtual cells. If it is determined that the cell of RAU and the cell of RAU2 are to be separate, the terminal may continuously communicate with RAU2 according to a general scheme.

If it is determined that the cell of RAU and the cell of RAU2 are to be merged, RAU2 transmits a "merging ready" message. In response to the "merging ready" message, the terminal transmits a "merging acknowledgment (ACK)" message to RAU2.

RAU2 transmits information associated with a virtual cell to the terminal using a "merging cell info" message. Information associated with the virtual cell may include an identifier of the virtual cell. If a merged cell is formed, an identifier of the cell of RAU1 and an identifier of the cell of RAU2 may both be included in the identifier of the virtual cell. Accordingly, if the terminal moves within the virtual cell, a handover may not occur.

In response to the "merging cell info" message, the terminal transmits a "merging cell info ACK" message. The corresponding cells of the central unit, RAU1, and RAU2 may merge to form the single virtual cell. RAU1 and RAU2 broadcast control information for communication with the terminal. A communication initialization process may be executed based on the control information.

Figure 15:
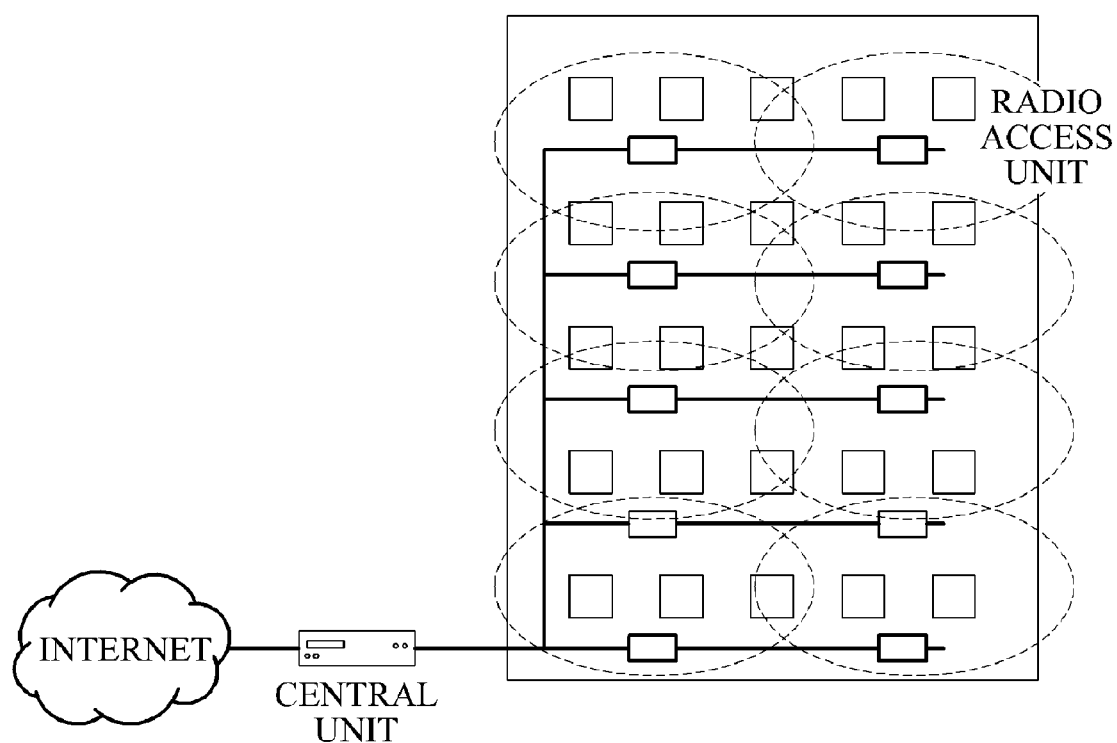
FIG. 15 is a diagram illustrating an example of applying a central unit and radio access units.

FIG. 15 illustrates an example of applying a central unit and radio access units.

Referring to FIG. 15, the radio access units may be installed in a building and may be connected to the central unit. The central unit may be connected to the Internet.

As shown in FIG. 15, certain examples may be applicable to a building that includes various radio access units and the like.

The processes, functions, methods, and/or software described above, including a terminal operating method, may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A central unit, comprising:
a central controller configured to merge at least two cells among a plurality of cells of radio access units, and separate at least one cell among the plurality of the cells of the radio access units, based on an amount of interference caused by at least one of the radio access units, to generate a virtual cell;
first processing modules configured to perform signal processing in a radio resource control (RRC) layer, a media access control (MAC) layer, and a physical (PHY) layer for the virtual cell; and
a switch configured to connect the first processing modules to the respective radio access units based on whether the plurality of cells of the radio access units are merged or separated,
wherein the radio access units comprise respective second processing modules, each of the second processing modules configured to transmit and receive a radio frequency (RF) signal using an antenna.

2. The central unit of claim 1, wherein the central controller is further configured to:
merge the at least two cells, and separate the at least one cell, based on a distribution of terminals served by the radio access units, or statuses of channels formed between the radio access units and the terminals, or an amount of traffic for the terminals, or any combination thereof.

3. The central unit of claim 2, wherein the central controller comprises a database configured to:
manage information associated with the statuses of the channels formed between the radio access units and the terminals; and
manage information associated with the amount of traffic.

4. The central unit of claim 2, wherein the central controller comprises a mobility manager configured to:
gather information associated with a mobility of the terminals.

5. The central unit of claim 2, wherein the central controller comprises a virtual cell manager configured to:
manage and control the virtual cell.

6. The central unit of claim 2, wherein the central controller comprises an inter-cell interference coordinator configured to:
control interference occurring in the virtual cell.

7. The central unit of claim 2, wherein the central controller comprises a quality of service (QoS) manager configured to:
manage a QoS requested by the terminals, and a priority of the terminals.

8. The central unit of claim 1, wherein, if the virtual cell is generated based on a cell of a radio access unit, the switch is further configured to:
connect a second processing module included in the radio access unit to one of the first processing modules.

9. The central unit of claim 1, wherein, if a cell of a first radio access unit and a cell of a second radio access unit are merged into the virtual cell, the switch is further configured to:
connect a second processing module included in the first radio access unit, and a second processing module included in the second radio access unit, to one of the first processing modules.

10. The central unit of claim 1, wherein at least one of the first processing modules and the second processing modules comprises an RF module configured to convert between the RF signal and a baseband signal.

11. The central unit of claim 10, wherein the radio access units and the central unit are further configured to:
transmit and receive the RF signal, or the baseband signal, or any combination thereof.

12. The central unit of claim 1, wherein, if a radio access unit comprises both a first processing module and a second processing module, the switch is further configured to:
directly connect the radio access unit to the central controller.

13. The central unit of claim 12, wherein, if the radio access unit and another radio access unit comprising a second processing module are merged with each other to generate the virtual cell, the switch is further configured to:
connect the second processing module included in the radio access unit, and the second processing module included in the other radio access unit, to one of the first processing modules.

14. The central unit of claim 12, wherein, if the first processing module included in the radio access unit is connected to a second processing module included in another radio access unit so that the radio access unit and the other radio access unit generate the virtual cell, the switch is further configured to:

directly connect the first processing module included in the radio access unit, and the second processing module included in the other radio access unit, to the central controller.

15. The central unit of claim 1, wherein the central unit is connected to another central unit.

16. The central unit of claim 15, wherein a cell of a radio access unit associated with the central unit is merged with a cell of another radio access unit associated with the other central unit to generate the virtual cell.

17. The central unit of claim 1, wherein the central controller is further configured to:
merge the at least two cells, and separate the at least one cell, based on a data rate requested by a terminal served by at least one of the radio access units.

18. A method of operating a terminal, the method comprising:
transmitting, to at least one of radio access units, information associated with an amount of interference caused by at least one of the radio access units;
receiving, from at least one of the radio access units, information associated with a virtual cell, the virtual cell generated by merging or separating cells of the radio access units based on the information associated with the amount of interference for cooperative communication with respect to the terminal; and
performing an initialization for communication with the radio access units in the virtual cell.

19. The method of claim 18, wherein the information associated with the virtual cell comprises an identifier of the virtual cell.

20. The method of claim 18, further comprising:
requesting the merging or separating of the cells of the radio access units.

21. The method of claim 18, further comprising:
transmitting, to at least one of the radio access units, information associated with a data rate requested by the terminal, a QoS requested by the terminal, and a channel status,
wherein the virtual cell is generated by merging or separating the cells of the radio access units based on the information associated with the data rate requested by the terminal, the QoS requested by the terminal, and the channel status.

22. A non-transitory computer-readable recording medium storing a program to implement a method of operating a terminal, the method comprising:
transmitting, to at least one of radio access units, information associated with an amount of interference caused by at least one of the radio access units;
receiving, from at least one of the radio access units, information associated with a virtual cell, the virtual cell generated by merging or separating cells of the radio access units based on the information associated with the amount of interference for cooperative communication with respect to the terminal; and
performing an initialization for communication with the radio access units in the virtual cell.

23. The non-transitory computer-readable recording medium of claim 22, the method further comprising:
transmitting, to at least one of the radio access units, information associated with a data rate requested by the terminal, a QoS requested by the terminal, and a channel status,
wherein the virtual cell is generated by merging or separating the cells of the radio access units based on the information associated with the data rate requested by the terminal, the QoS requested by the terminal, and the channel status.

* * * * *